United States Patent
Hochstetter et al.

(10) Patent No.: US 12,466,152 B2
(45) Date of Patent: *Nov. 11, 2025

(54) MULTILAYER STRUCTURE FOR TRANSPORTING OR STORING HYDROGEN

(71) Applicant: Arkema France, Colombes (FR)

(72) Inventors: Gilles Hochstetter, Colombes (FR); Patrick Dang, Serquigny (FR); Thibaut Savart, Lacq (FR)

(73) Assignee: ARKEMA FRANCE, Puteaux (FR)

( * ) Notice: Subject to any disclaimer, the term of this patent is extended or adjusted under 35 U.S.C. 154(b) by 599 days.

This patent is subject to a terminal disclaimer.

(21) Appl. No.: 17/628,973

(22) PCT Filed: Jul. 28, 2020

(86) PCT No.: PCT/FR2020/051386
§ 371 (c)(1),
(2) Date: Jan. 21, 2022

(87) PCT Pub. No.: WO2021/019181
PCT Pub. Date: Feb. 4, 2021

(65) Prior Publication Data
US 2022/0258446 A1    Aug. 18, 2022

(30) Foreign Application Priority Data
Jul. 30, 2019    (FR) ...................... 1908669

(51) Int. Cl.
*B32B 1/08* (2006.01)
*B32B 1/00* (2006.01)
(Continued)

(52) U.S. Cl.
CPC ............... *B32B 1/08* (2013.01); *B32B 1/00* (2013.01); *B32B 5/02* (2013.01); *B32B 15/02* (2013.01); *B32B 15/088* (2013.01); *B32B 27/12* (2013.01); *B32B 27/20* (2013.01); *B32B 27/34* (2013.01); *C08L 77/06* (2013.01); *F17C 1/16* (2013.01); *B32B 2260/021* (2013.01); *B32B 2260/046* (2013.01); *B32B 2262/101* (2013.01); *B32B 2262/106* (2013.01); *B32B 2262/108* (2013.01); *B32B 2439/40* (2013.01); *B32B 2597/00* (2013.01); *C08L 2205/025* (2013.01);
(Continued)

(58) Field of Classification Search
CPC .. B32B 1/00; B32B 1/08; B32B 15/02; B32B 15/088; B32B 2260/021; B32B 2260/023; B32B 2260/046; B32B 2262/0253; B32B 2262/0269; B32B 2262/04; B32B 2262/065; B32B 2262/08; B32B 2262/101; B32B 2262/106; B32B 2262/108; B32B 2264/108; B32B 2307/30; B32B 2307/306; B32B 2439/40; B32B 2597/00; B32B 27/12; B32B 27/20; B32B 27/285; B32B 27/288; B32B 27/34; B32B 27/36; B32B 37/04; B32B 5/02; B32B 7/027; B32B 7/04; F17C 1/16; F17C 2203/0604; F17C 2203/0609; F17C 2203/0619; F17C 2203/066; F17C 2203/0663; F17C 2203/0673; F17C 2203/0675; F17C 2209/2118; F17C 2209/2127; F17C 2209/2154; F17C 2209/221; F17C 2221/012; F17C 2270/0168; F17C 2270/0171; F17C 2270/0184; C08L 2205/025; C08L 77/02; C08L 77/06
See application file for complete search history.

(56) References Cited

U.S. PATENT DOCUMENTS

2009/0071595 A1    3/2009    Matz et al.
2014/0020819 A1    1/2014    Kremers
(Continued)

FOREIGN PATENT DOCUMENTS

CN    109071803 A    12/2018
EP    1505099 A2    2/2005
(Continued)

OTHER PUBLICATIONS

International Search Report (PCT/ISA/210) and Written Opinion (PCT/ISA/237) received for PCT Patent Application No. PCT/FR2020/051385, mailed on Oct. 15, 2020, 19 pages including 9 pages of English Translation.
(Continued)

*Primary Examiner* — Yan Lan
(74) *Attorney, Agent, or Firm* — Boone IP Law

(57) ABSTRACT

A multilayer structure selected from a reservoir, a pipe or a tube, for transporting, distributing or storing hydrogen, including, from the inside to the outside, at least one sealing layer and at least one composite reinforcing layer, the innermost composite reinforcing layer being welded to the outermost adjacent sealing layer, the sealing layers including at least one semi-crystalline thermoplastic polymer, the Tm of which is less than 280° C., wherein the at least one thermoplastic polymer of each sealing layer may be the same or different, and at least one of the composite reinforcing layers being of a fibrous material in the form of continuous fibers impregnated with a composition of at least one thermoplastic polymer P2j, the thermoplastic polymer P2j having a Tg greater than the maximum temperature of use of said structure (Tu), with Tg≥Tu+20° C., Tu being greater than 50° C.

23 Claims, No Drawings

(51) Int. Cl.
 *B32B 1/02* (2006.01)
 *B32B 5/02* (2006.01)
 *B32B 15/02* (2006.01)
 *B32B 15/088* (2006.01)
 *B32B 27/12* (2006.01)
 *B32B 27/20* (2006.01)
 *B32B 27/34* (2006.01)
 *C08L 77/06* (2006.01)
 *F17C 1/16* (2006.01)

(52) U.S. Cl.
 CPC .............. *F17C 2203/0604* (2013.01); *F17C 2203/0619* (2013.01); *F17C 2203/066* (2013.01); *F17C 2203/0673* (2013.01); *F17C 2203/0675* (2013.01); *F17C 2209/2118* (2013.01); *F17C 2209/2127* (2013.01); *F17C 2209/2154* (2013.01); *F17C 2209/221* (2013.01); *F17C 2221/012* (2013.01)

(56) References Cited

U.S. PATENT DOCUMENTS

| | | |
|---|---|---|
| 2015/0083264 A1 | 3/2015 | Choo et al. |
| 2017/0158856 A1 | 6/2017 | Jung |
| 2018/0172185 A1 | 6/2018 | Ishii et al. |
| 2020/0377773 A1 | 12/2020 | Briffaud et al. |
| 2022/0243843 A1* | 8/2022 | Hochstetter ............ B29C 63/34 |

FOREIGN PATENT DOCUMENTS

| | | |
|---|---|---|
| EP | 2851190 A1 | 3/2015 |
| EP | 3309438 A1 | 4/2018 |
| FR | 2964173 A1 | 3/2012 |
| FR | 3049952 A1 | 10/2017 |
| FR | 3059072 A1 | 5/2018 |
| JP | 2004019773 A | 1/2004 |
| KR | 1020170099945 A | 9/2017 |
| KR | 1020180093996 A | 8/2018 |
| WO | 03074258 A1 | 9/2003 |
| WO | 2012118379 A1 | 9/2012 |
| WO | 2017191735 A1 | 11/2017 |
| WO | 2018091693 A1 | 5/2018 |

OTHER PUBLICATIONS

International Search Report (PCT/ISA/210) with English translation and Written Opinion (PCT/ISA/237) mailed on Oct. 16, 2020, by the European Patent Office as the International Searching Authority for International Application No. PCT/FR2020/051386.
U.S. Appl. No. 18/968,434, Gilles Hochstetter, filed Dec. 4, 2024.

* cited by examiner

MULTILAYER STRUCTURE FOR TRANSPORTING OR STORING HYDROGEN

TECHNICAL FIELD

The present patent application relates to multilayer composite structures for transporting, distributing, or storing hydrogen and the method for making them.

PRIOR ART

One of the goals sought in the automotive field is to propose less and less polluting vehicles. Thus, electric or hybrid vehicles comprising a battery aim to progressively replace combustion engine vehicles such as either gas or diesel vehicles. It has turned out that the battery is a relatively complex vehicle component. Depending on the positioning of the battery in the vehicle, it may be necessary to protect it from impact and from the outside environment, which can have extreme temperatures and variable humidity. It is also necessary to avoid any risk of flames.

Additionally, it is important that the operating temperature thereof not exceed 55° C. in order to not break down the cells of the battery and to preserve the life thereof. Conversely, for example in winter, it may be necessary to increase the battery temperature so as to optimize operation thereof.

Moreover, electric vehicles still suffer today from several problems, namely battery range, the use in these batteries of rare earths whose resources are not inexhaustible, as well as a problem of electricity production in various countries to be able to recharge the batteries.

Hydrogen is therefore an alternative to the electric battery, since hydrogen can be converted into electricity by means of a fuel cell and thus power electric vehicles.

However, the storage of hydrogen is technically difficult and costly due to its very low molar mass and very low liquefaction temperature, especially when it comes to mobile storage. However, to be effective, storage must be carried out in small volumes, which means that the hydrogen must be kept under high pressure, given the temperatures at which vehicles are used. This is the case, in particular, for fuel cell hybrid road vehicles for which the goal is a range of around 600 to 700 km, or even less, for essentially urban use in addition to a battery-powered electric base.

Hydrogen reservoirs are usually made of a metallicmetalliclic liner that must prevent hydrogen from leaking out. This first liner must itself be protected by a second liner (usually made of composite materials) designed to withstand the internal pressure of the reservoir (e.g. 700 bar) and to withstand any impact or heat sources. The valve system must also be safe.

According to the French Hydrogen and Fuel Cell Association (AFHYPAC) Hydrogen Memento Sheet 4.2, December 2016 revision, pressurized hydrogen storage and distribution has been standard practice for very many years with cylindrical, steel cylinders or cylinder assemblies inflated to 20 or 25 MPa (Types I and II). The disadvantage of this storage method is the size—only 14 kg/m3 at 20 MPa and at ordinary temperature (21° C.) compared to 100 kg/m$^3$ for methane—and above all the weight, which results from the use of low-stress steels to avoid hydrogen embrittlement problems. The situation has changed radically with the advent of composite reservoir technology, known as Type III or IV. Their basic principle is to separate the two essential functions of sealing and mechanical strength and manage them independently of each other. In this type of reservoir, a bladder made of resin (thermosetting or thermoplastic), also known as a liner (or sealing sheath), is combined with a reinforcing structure consisting of fibers (glass, aramid, carbon), also known as a reinforcing layer or sleeve, which allows the reservoir to operate at much higher pressures while reducing its mass and avoiding the risk of explosive rupture in the event of severe external aggression. Thus, 70 MPa (700 bar) has practically become the current standard.

In Type IV reservoirs, the liner and the reinforcing layer are made of different materials, which has the disadvantage of presenting a lack of adhesion between the liner and the reinforcing layer, which causes problems of liner collapse when there is both an accumulation of gas at the interface between the liner and the composite and a drop in the internal pressure of the reservoir.

This problem has led to the development of V-type reservoirs, which are based on using the same polymer for the liner and the composite matrix in order to guarantee excellent and durable adhesion between the liner and the composite.

When transporting or distributing hydrogen by means of rigid or flexible pipes, it is also preferable that the hydrogen is at a low volume and therefore a high pressure, to ensure sufficient flow. Thus, as with storing, transporting, or distributing hydrogen, it is interesting to use composite pipes composed of a sealing sheath (ensuring airtightness and chemical resistance), reinforced by an outer layer made of composite material, which is manufactured by filament winding, from unidirectional (UD) tapes deposited in successive layers on the liner. When it is desired to make this pipe flexible, one possibility is to wind the UD tape with one or more angles of orientation with respect to the axis of the pipe so that the composite reinforcement can support the deformations of the composite pipe during its use. The composite reinforcement allows the pipe to withstand the internal pressure generated by the fluid being transported.

As for storage reservoirs, it is necessary that the sealing sheath resists collapse, especially during production stops leading to a sudden drop in pressure. This risk of collapse exists when the sheath is not adhered to the composite reinforcement and gas may be present between the sealing sheath and the composite reinforcement. To avoid this phenomenon, one solution is to add an internal reinforcement to the composite jacket, called the carcass: this reinforcement, which is often metalliclic, is perforated to be flexible and is therefore not sealed against the fluid being transported. It adds weight, complexity and cost to the flexible pipe. Also, to reduce the weight or even eliminate the internal carcass of the composite pipes, it is necessary that the composite reinforcement adheres to the sealing sheath, as in the case of Type V storage reservoirs.

In addition, the sealing sheath must be able to be extruded continuously, possibly on the support of an internal carcass, as described above. This sealing sheath must be sufficiently chemically stable so that its mechanical and sealing characteristics do not deteriorate in a way that would be prohibitive during the life of the reservoir or flexible pipe.

In the case of a flexible pipe with an internal metalliclic carcass, the sealing liner must also be able to withstand the effect of creep of the material it is made of, due to the stresses generated on the sealing sheath by the internal pressure of the pipe. Creep occurs in the joints (gap or clearance) between the metallic armoring (e.g. self-clinching zeta or T geometry) on which the liner rests when the pipe is pressurized by the effluent being transported, creating protrusions of material which generate stress concentrations and are therefore preferred failure zones for the sealing sheath: the material making up the sealing sheath must therefore also withstand these stress concentrations.

For example, Airborne has developed a variety of flexible pipes, without an internal carcass and with a sealing sheath adhered to the composite reinforcement, comprising:

a PA 11 liner with a PA11 FC composite (JIP completed in 2011) or a PA12 liner with PA12 FC composite or even a PVDF liner with a PVDF FC composite. However, all these structures have the disadvantage that the matrix of the composite reinforcement has a glass transition temperature, Tg, lower than the pipe's temperature of use, Tu, that is, in the case of PA11 or PA12-based pipes, a Tg of 50° C. in the dry state for a pipe temperature of use, Tu, of 60 to 80° C. and in the case of PVDF, a Tg of −40° C., for a temperature of use in continuous operation above 100° C. and often close to 130° C. In the particular case of PVDF, the stiffness (modulus) of the matrix remains high above its Tg until it reaches another transition, the alpha transition at around 100° C., beyond which its behavior becomes purely rubbery. Thus, in all the above industrial and commercial cases of TP matrix composite pipes, the matrix of the composite reinforcement is in a fully rubberized state at the composite pipe temperature of use Tu.

To remedy this problem and to have a composite reinforcement whose matrix has a Tg higher than the maximum temperature of use, so as not to be in a rubberized state at the temperature of use, in this case 130° C., Kutting & Total, then Vitrex and Magma, have developed a solution composed of a PEEK sealing sheath (or liner) reinforced by a composite with a PEEK matrix. The Tg of PEEK is 140° C. and therefore meets the requirement of high rigidity because this Tg is higher than the maximum temperature of use. The disadvantage is that, as a result, the sealing sheath is also very rigid, which can limit its fatigue life and is a major disadvantage for the production of flexible pipes. In addition, the processing temperature of this type of sealing sleeve is very high (typically 380-400° C.) and in the case of the usual transformation process, which is tube extrusion, this poses major difficulties in terms of tooling and process control.

In addition, Ticona (Celanese), in partnership with Airborne, offers a composite pipe with a PPS FC reinforcement and a PPS sealing sheath.

For Tus>90° C., this structure poses the same problem for the composite matrix as the PVDF-based solution (that is Tg<Tu), but additionally presents the problem of transformation temperature (typically 350° C. vs. 250° C., for PPS and PVDF, respectively).

For Tus<90° C., PPS is suitable for the composite matrix, but the problem of the extrusion temperature of the sealing liner remains, as well as the problem of its high rigidity, which limits the flexibility of the composite pipe.

The case of hydrogen reservoirs poses a similar technical problem because its rapid filling with hydrogen causes an increase in the temperature of the reservoir due to the compression of the hydrogen, especially at about 110° C., which requires that the composite be oversized, in case the matrix of the composite has a Tg lower than this temperature.

Thus, it remains to optimize, on the one hand, the matrix of the composite so as to optimize its mechanical strength at high temperature and, on the other hand, the material making up the sealing liner, so as to optimize its application temperature, without degrading the adhesion of the composite reinforcement to the sealing liner. Thus, the possible modification of the composition of the material composing the sealing liner, which will be made to ensure at least partial miscibility with the matrix of the composite, must not result in a significant increase of the manufacturing temperature (extrusion-blowing, injection, rotational molding, etc.) of this liner, compared to what is practiced today with polyamides and the PVDFs.

These problems are solved by providing a multilayer structure of the present invention which is a fully bonded, "bi-material" composite pipe or reservoir, and composed of a high strength composite reinforcement, that is comprising a high-Tg matrix, deposited in particular by filament winding on a liner previously extruded at relatively low temperature. The adhesion between the composite and the liner is very good.

Throughout this description, the terms "liner", "sealing sheath" and "pressure jacket" have the same meaning.

The present invention thus relates to a multilayer structure selected from a reservoir, a pipe or tube, intended for transporting or storing hydrogen, comprising, from the inside to the outside, at least one sealing layer and at least one composite reinforcing layer, said innermost composite reinforcing layer being welded to said outermost adjacent sealing layer, said sealing layers consisting of a composition predominantly comprising at least one semi-crystalline thermoplastic polymer P1i (i=1 to n, n being the number of sealing layers), the Tm of which, as measured according to ISO 11357-3: 2013, is less than 280° C., in particular less than 265° C., said at least one thermoplastic polymer of each sealing layer may be the same or different, and at least one of said composite reinforcing layers consisting of a fibrous material in the form of continuous fibers impregnated with a composition predominantly comprising at least one thermoplastic polymer P2j, (j=1 to m, m being the number of reinforcing layers), which is in particular semi-crystalline, said thermoplastic polymer P2j having a Tg, as measured according to ISO 11357-3: 2013, greater than the maximum temperature of use of said structure (Tu), with Tg≥Tu+20° C., in particular Tg≥Tu+30° C., Tu being greater than 50° C., in particular greater than 100° C.

Thus, the Inventors unexpectedly found that using a different polymer for the composite matrix and the liner and in particular:

a matrix of the composite reinforcement composed of a polymer having a Tg significantly greater than the maximum temperature of use of the reservoir or pipe, Tu, (Tg>Tu+20° C., in particular Tg≥Tu+30° C., typically) so as to remain in its glassy domain and to have a high rigidity, thus enabling the composite to have a high mechanical strength, the semi-crystalline polymer making up the liner having a low melting point, TmTm, allowing it to be processed by extrusion, extrusion blow molding, rotational molding, injection or by winding of a pure resin film, as the case may be, at a moderate temperature which is customary for the person skilled in the art, in relation to the Tm of this polymer, which is less than 280° C., preferably less than 265° C. Semi-crystalline polymers of low Tm known to date also have a low Tg, which in most cases will be below the maximum temperature of use. As a result, the polymer making up the liner will work in its rubberized domain and will therefore be very flexible and therefore very resistant to fatigue. Its semi-crystalline nature ensures good resistance to chemical aggression, abrasion and creep, and, the two aforementioned polymers (the one composing the matrix of the composite and the one composing the liner) are sufficiently miscible with each other to ensure the weldability of the composite to the liner and, consequently, an excellent adhesion between the liner and the composite. The durability of the adhesion will be guaranteed by the durability of the material constituting the mixture at the interface of the two materials, i.e. in the welded joint. The miscibility of the two polymers is expressed, preferably by a single Tg, or failing that, by a characteristic signature of a partially homogeneous mixture, for example by the presence of two Tg values intermediate to the Tg of the two pure polymers.

An immiscibility of two polymers results in the presence of two Tg in the mixture of the two polymers which correspond to the respective Tg of the pure polymers taken separately.

By "multilayer structure" is meant, for example, a reservoir, pipe or tube, comprising or consisting of several layers, in particular two layers.

The sealing layer or layers are the innermost layers compared to the composite reinforcing layers which are the outermost layers.

The sealing layer is in contact with the hydrogen even if an inner, and thus innermost, non-sealing metallic layer, formed by a helically wound profiled metallic strip such as a stapled strip to form said carcass, is present on which the sealing layer(s) is (are) coated by extrusion.

When several sealing layers are present, only the innermost of the sealing layers is in direct contact with the hydrogen.

When only a sealing layer and a composite reinforcing layer are present, thus leading to a two-layer multilayer structure, then those two layers are welded and thus adhere to each other, in direct contact with each other.

When several sealing layers and/or several composite reinforcing layers are present, then the outermost layer of said sealing layers, and thus the one opposite the layer in contact with the hydrogen, is welded to the innermost layer of said composite reinforcing layers, and thus adhered to each other, in direct contact with each other.

The other composite reinforcing layers are also welded together.

The other sealing layers are also welded together.

Regarding the Sealing Layer(s) and the Thermoplastic Polymer P1i

One or more sealing layers may be present.

Each of said layers consists of a composition predominantly comprising a at least one thermoplastic polymer P1i, i corresponding to the number of layers present. i is from 1 to 10, in particular from 1 to 5, in particular from 1 to 3, preferably i=1.

The term "predominantly" means that said at least one polymer is present in excess of 50% by weight relative to the total weight of the composition.

Advantageously, said at least one predominant polymer is present at more than 60% by weight, in particular at more than 70% by weight, particularly at more than 80% by weight, more particularly greater than or equal to 90% by weight, relative to the total weight of the composition.

Said composition may further comprise impact modifiers and/or additives.

The additives may be chosen from an antioxidant, a heat stabilizer, a UV absorber, a light stabilizer, a lubricant, an inorganic filler, a flame-retardant agent, a nucleating agent, a plasticizer, a dye, carbon black, and carbonaceous nanofillers.

Advantageously, said composition predominantly consists of said thermoplastic polymer P1i, from 0 to 5% by weight of impact modifier, from 0 to 5% by weight of additives, the sum of the constituents of the composition being equal to 100% (based on a maximum P2i of 90%).

Said at least one predominant polymer in each layer may be the same or different.

In one embodiment, a single predominant polymer is present in at least the sealing layer welded to the composite reinforcing layer.

Thermoplastic Polymer P1i

Thermoplastic, or thermoplastic polymer, refers to a semi-crystalline material that is generally solid at ambient temperature, and which softens during a temperature increase, in particular after passing its glass transition temperature (Tg), and may exhibit a sharp transition upon passing what is referred to as its melting point (Tm), and which becomes solid again when the temperature decreases below its crystallization temperature.

The Tg, Tc, and Tm are determined by differential scanning calorimetry (DSC) according to standards 11357-2:2013 and 11357-3:2013, respectively.

The number-average molecular weight Mn of said thermoplastic polymer is preferably in a range from 10000 to 40000, preferably from 12000 to 30000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Examples of suitable semi-crystalline thermoplastic polymers in the present invention include:
polyamides, including copolymers for example polyamide-polyether copolymers, polyesters, and PVDF and a PVDF/PEI blend wherein PVDF is predominant.

More particularly preferred among the semi-crystalline polymers are polyamides and their semi-crystalline copolymers.

The nomenclature used to define the polyamides is described in ISO standard 1874-1:2011 "Plastiques—Matériaux polyamides (PA) pour moulage et extrusion—Partie 1: Designation", in particular on page 3 (tables 1 and 2) and is well known to the skilled person.

The polyamide may be a homopolyamide or a co-polyamide or a mixture thereof.

Advantageously, said thermoplastic polymer is a long-chain aliphatic polyamide, that is to say a polyamide having an average number of carbon atoms per nitrogen atom greater than 8.5, preferably greater than 9.

In particular, the long-chain aliphatic polyamide is selected from:
polyamide 11 (PA11), polyamide 12 (PA12), polyamide 1010 (PA1010), polyamide 1012 (PA1012), polyamide 1212 (PA1012), or a mixture thereof or a copolyamide thereof, in particular PA11 and PA12.

Advantageously, said thermoplastic polymer is a long-chain semi-aromatic polyamide, that is to say a polyamide having an average number of carbon atoms per nitrogen atom greater than 8.5, preferably greater than 9 and a melting point from 240° C. to less than 280° C.

In particular, the long-chain semi-aromatic polyamide is chosen from polyamide 11/5T or 11/6T or 11/10T. Obviously in this case, the ratio of 11 must be chosen so that the Tm of said polymers is lower than 280° C., preferably lower than 265° C.

Advantageously, each sealing layer consists of a composition comprising the same type of polymer, in particular a polyamide.

Advantageously, said composition comprising the said polymer P1i is black in color and capable of absorbing radiation suitable for welding.

There are various methods for welding thermoplastic polymer parts. Thus, contact or non-contact heating blades, ultrasound, infrared, vibrations, rotation of one element to be welded against the other or even laser welding may be used.

The welding of thermoplastic polymer elements, in particular by laser welding, requires that the two elements to be welded have different properties with respect to radiation, in particular laser radiation: one of the elements must be transparent to radiation, in particular laser radiation, and the other must absorb the radiation, in particular laser radiation. The radiation in particular laser radiation thus passes through the transparent part and then reaches the absorbing element, where it is converted into heat. This allows the contact area between the two elements to melt and thus the welding to take place.

In some applications, it is desirable that both parts to be welded are black, including the part that is transparent to laser radiation.

In order to make them absorbent, it is known to add various additives, including for example carbon black, which gives the polymer a black color and allows it to absorb radiation suitable for welding.

In one embodiment, the welding is performed by a system selected from laser, infrared (IR) heating, LED heating, induction or microwave heating or high frequency (HF) heating.

In the case where the welding is carried out by laser welding, then the composition P1i comprises non-agglomerated or non-aggregated carbonaceous fillers.

In the case where the welding is carried out by induction, then the composition P1i comprises metallic particles.

Advantageously, the welding is performed by a laser system.

Regarding the Composite Reinforcing Layer and the Thermoplastic Polymer P2j

One or more composite reinforcing layers may be present.

Each of the said layers consists of a composition predominantly comprising at least one thermoplastic polymer P2j, j corresponding to the number of layers present.

j is comprised from 1 to 10, particularly 1 to 5, particularly 1 to 3, preferentially j=1.

The term "predominantly" means that said at least one polymer is present in excess of 50% by weight relative to the total weight of the composition.

Advantageously, said at least one predominant polymer is present at more than 60% by weight, in particular at more than 70% by weight, particularly at more than 80% by weight, more particularly greater than or equal to 90% by weight, relative to the total weight of the composition.

Said composition may further comprise impact modifiers and/or additives.

The additives may be chosen from an antioxidant, a heat stabilizer, a UV absorber, a light stabilizer, a lubricant, an inorganic filler, a flame retardant agent, a nucleating agent, a plasticizer, and a dye.

Advantageously, said composition predominantly consists of said thermoplastic polymer P2j, from 0 to 5% by weight of impact modifier, from 0 to 5% by weight of additives, the sum of the constituents of the composition being equal to 100% (based on a maximum P2j of 90%).

Said at least one predominant polymer in each layer may be the same or different.

In one embodiment, a single predominant polymer is present at least in the composite reinforcing layer welded to the sealing layer.

In one embodiment, each reinforcing layer comprises the same type of polymer, in particular a polyamide.

Thermoplastic Polymer P2j

Thermoplastic, or thermoplastic polymer, refers to a material that is generally solid at ambient temperature, which may be semi-crystalline or amorphous, in particular semi-crystalline, and that softens during a temperature increase, in particular after passing its glass transition temperature (Tg) and flows at a higher temperature when it is amorphous, or that may exhibit a sharp transition upon passing its so-called melting temperature (Tm) when it is semi-crystalline, and which becomes solid again when the temperature decreases below its crystallization temperature Tc (for a semi-crystalline) and below its glass transition temperature (for an amorphous).

The Tg, Tc, and Tm are determined by differential scanning calorimetry (DSC) according to standard 11357-2:2013 and 11357-3:2013, respectively.

The polymer P2j of the composition of at least one of said composite reinforcing layers is such that its Tg is greater than the maximum temperature of use (Tu) of said structure and, in particular, the Tg≥Tu+20° C., especially Tg≥Tu+30° C.

In one embodiment, the polymer P2j has a Tg≥Tu+20° C., in particular Tg≥Tu+30° C., regardless of the position of said reinforcing layer.

In another embodiment, said reinforcing layer consisting of a composition comprising the polymer P2j having a Tg≥Tu+20° C., especially Tg≥Tu+30° C., is the layer welded to said sealing layer.

In one embodiment, the polymer P2j of the composition of at least one of said composite reinforcing layers is such that its Tg is greater than the maximum temperature of use (Tu) of said structure Tg≥Tu+20° C. and said reinforcing layer consisting of a composition comprising the polymer P2j is the layer welded to said sealing layer.

In one embodiment, the polymer P2j of the composition of at least one of said composite reinforcing layers is such that its Tg is greater than the maximum temperature of use (Tu) of said structure Tg≥Tu+30° C. and said reinforcing layer consisting of a composition comprising the polymer P2j is the layer welded to said sealing layer.

In another embodiment, said reinforcing layer consisting of a composition comprising the polymer P2j has a Tg≥Tu+20° C., especially Tg≥Tu+30° C., is the outermost reinforcement layer of the structure. The number-average molecular weight Mn of said thermoplastic polymer is preferably in a range from 10000 to 40000, preferably from 12000 to 30000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Examples of suitable semi-crystalline thermoplastic polymers in the present invention include:

polyamides, in particular comprising an aromatic and/or cycloaliphatic structure, including copolymers, for example polyamide-polyether copolymers, polyesters, polyaryletherketones (PAEK), polyetheretherketones (PEEK), polyetherketoneketones (PEKK), polyetherketone etherketone ketones (PEKEKK), polyimides, in particular polyetherimides (PEI) or polyamide-imides, polysulfones (PSU), in particular polyarylsulfones such as polyphenylsulfones (PPSU), polyethersulfones (PES).

Semi-crystalline polymers are particularly preferred, and in particular polyamides and their semi-crystalline copolymers.

The nomenclature used to define the polyamides is described in ISO standard 1874-1:2011 "Plastiques—Matériaux polyamides (PA) pour moulage et extrusion—Partie 1: Designation", in particular on page 3 (tables 1 and 2) and is well known to the skilled person.

The polyamide can be a homopolyamide or a co-polyamide or a mixture thereof.

Advantageously, the semi-crystalline polyamides are semi-aromatic polyamides, particularly a semi-aromatic polyamide of formula X/YAr, as described in EP1505099, particularly a semi-aromatic polyamide of formula A/XT wherein A is selected from a unit obtained from an amino acid, a unit obtained from a lactam and a unit corresponding to the formula (Ca diamine).(Cb diacid), with a representing the number of carbon atoms of the diamine and b representing the number of carbon atoms of the diacid, a and b each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids;

X.T denotes a unit obtained from the polycondensation of a Cx diamine and terephthalic acid, with x representing the number of carbon atoms of the Cx diamine, x being between 5 and 36, advantageously between 9 and 18, in particular a polyamide with formula A/5T, A/6T, A/9T, A/10T, or A/11T, A being as defined above, in particular a polyamide chosen from among a PA MPMDT/6T, a PA11/10T, a PA 5T/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/6T, PA 11/MPMDT/10T, PA 11/BACT/10T, a PA 11/MXDT/10T, an 11/5T/10T.

T corresponds to terephthalic acid, MXD corresponds to m-xylylene diamine, MPMD corresponds to methylpentamethylene diamine and BAC corresponds to bis(aminomethyl)cyclohexane. Said semi-aromatic polyamids defined above particularly have a Tg greater than or equal to 80° C.

Advantageously, each composite reinforcing layer consists of a composition comprising the same type of polymer, in particular a polyamide.

Advantageously, said composition comprising said polymer P2j is transparent to radiation suitable for welding.

Thermoplastic polymers are generally transparent for welding purposes, especially laser welding. Carbonaceous nanofillers make it possible to impart a black color to a layer of a composition comprising a thermoplastic polymer, while maintaining the transparency to laser radiation of said layer.

Advantageously, the carbonaceous nanofillers are non-agglomerated or non-aggregated.

Advantageously, the carbonaceous nanofillers are incorporated into the composition in an amount from 100 ppm to 500 ppm, and preferably from 100 ppm to 250 ppm.

Advantageously, the carbonaceous nanofillers are selected from carbon nanotubes (CNTs), carbon nanofibers, graphene, nanoscale carbon black and mixtures thereof.

Advantageously, the carbonaceous nanofillers are free of nanometric carbon black.

In one embodiment, the welding is performed by a system selected from laser, IR heating or induction heating.

Advantageously, the welding is performed by a laser system.

Advantageously, the laser radiation is infrared laser radiation, and preferably has a wavelength between 700 nm and 1200 nm and preferably between 800 nm and 1100 nm.

Regarding the Structure

Said multilayer structure thus comprises at least one sealing layer and at least one composite reinforcing layer which are welded together.

In one embodiment, in said multilayer structure, each polymer P1i of each sealing layer is partially or fully miscible with each polymer P1i of the adjacent layer(s), each polymer P2j of each reinforcing layer is partially or fully miscible with each polymer P2j of the adjacent layer(s), and each polymer P2j is partially or fully miscible with each polymer P1i when they are adjacent, and polymer P21 is partially or fully miscible with polymer P11 adjacent thereto, the total or partial miscibility of the said polymers being defined by the difference in glass transition temperature of the two resins, in the mixture, with respect to the difference in glass transition temperature of the two resins, before the mixture, and the miscibility being total when said difference is equal to 0, and the miscibility being partial, when said difference is different from 0, an immiscibility of the polymer P2j with the polymer P1i being excluded.

When the miscibility of said polymers is partial, said difference is said miscibility is greater the smaller said difference is.

Advantageously, when the miscibility of said polymers is partial, said difference is less than 30%, preferably less than 20%, in absolute value.

In one embodiment, the glass transition temperature(s) of the mixture, depending on whether the miscibility is full or partial, which must be between and different from the glass transition temperatures of said polymers prior to blending, of at least 5° C., preferably of at least 10° C.

The expression "fully miscible" means that when, for example, two polymers $P1_1$ and $P1_2$ having respectively a $Tg1_1$ and a $Tg1_2$ are present in two adjacent sealing layers or two adjacent reinforcing layers, then the mixture of the two polymers has only one $Tg1_11_2$, the value of which is between $Tg1_1$ and a $Tg1_2$.

This $Tg1_11_2$ value is then greater than $Tg1_1$ by at least 5° C., in particular by at least 10° C. and lower than $Tg1_2$ by at least 5° C., in particular by at least 10° C.

The expression "partially miscible" means that when, for example, two polymers $P1_1$ and $P1_2$ having respectively a $Tg1_1$ and a $Tg1_2$ are present in two adjacent sealing layers or two adjacent reinforcing layers, then the mixture of the two polymers has two Tgs: $Tg'1_1$ et $Tg'1_2$, where $Tg1_1 < Tg'1_1 < Tg'1_2 < Tg1_2$.

These $Tg'1_1$ and $Tg'1_2$ values are then greater than $Tg1_1$ by at least 5° C., in particular by at least 10° C. and lower than $Tg1_2$ by at least 5° C., in particular by at least 10° C.

An immiscibility of two polymers results in the presence of two Tg, $Tg1_1$ and $Tg1_2$, in the mixture of the two polymers which correspond to the respective Tg, $Tg1_1$ and $Tg1_2$, of the pure polymers taken separately.

Advantageously, said welded sealing and reinforcing layers are made of compositions which respectively comprise different polymers.

Nevertheless, said different polymers may be of the same type.

Thus, if one of the two welded composite reinforcing and sealing layers is made of a composition comprising an aliphatic polyamide, then the other layer is made of a composition comprising a polyamide which is not aliphatic and which is for example a semi-aromatic polyamide so as to have a high-Tg polymer as the matrix of the composite reinforcement.

Said multilayer structure may comprise up to 10 sealing layers and up to 10 composite reinforcing layers.

It is obvious that said multilayer structure is not necessarily symmetrical and that it may therefore comprise more sealing layers than composite layers or vice versa.

Advantageously, said multilayer structure comprises one, two, three, four, five, six, seven, eight, nine or ten sealing layers and one, two, three, four, five, six, seven, eight, nine or ten composite reinforcing layers.

Advantageously, said multilayer structure comprises one, two, three, four or five sealing layers and one, two, three, four or five composite reinforcing layers.

Advantageously, said multilayer structure comprises one, two or three sealing layers and one, two, or three composite reinforcing layers.

Advantageously, they consist of compositions which respectively comprise different polymers.

Advantageously, they consist of compositions which respectively comprise polyamides corresponding to the polyamides P1i and P2j.

Advantageously, they consist of compositions which respectively comprise different polyamides.

In one embodiment, said multilayer structure comprises a single sealing layer and several reinforcing layers, said sealing layer being welded to said adjacent reinforcing layer.

In another embodiment, said multilayer structure comprises a single reinforcing layer and several sealing layers, said reinforcing layer being welded to said adjacent sealing layer.

In one advantageous embodiment, said multilayer structure comprises a single sealing layer and a single composite reinforcing layer which are welded together.

All combinations of these two layers are therefore within the scope of the invention, provided that at least said innermost composite reinforcing layer is welded to said outermost adjacent sealing layer, the other layers being welded together or not.

Advantageously, in said multilayer structure, each sealing layer consists of a composition comprising the same type of polymer P1i, in particular a polyamide.

The expression same type of polymer means, for example, a polyamide which may be the same or a different polyamide depending on the layers.

Advantageously, said polymer P1i is a polyamide and said polymer P2j is a polyamide.

Advantageously, the polyamide P1i is identical for all the sealing layers.

Advantageously, said polymer P1i is a long-chain aliphatic polyamide, in particular PA1010, PA 1012, PA 1212, PA11, PA12, in particular PA 11 or PA12.

Advantageously, the polyamide P1i is a long-chain semi-aromatic polyamide, in particular PA 11/5T, PA 11/6T or PA 11/10T. Obviously in this case, the ratio of 11 must be chosen carefully so that the Tm of said polymers is lower than 280° C., preferably 265° C.

Advantageously, in said multilayer structure, each reinforcing layer consists of a composition comprising the same type of polymer P2j, in particular a polyamide.

Advantageously, the polyamide P2j is identical for all the reinforcing layers.

Advantageously, said polymer P2j is a semi-aromatic polyamide chosen from a PA MXDT/6T, a PA 11/10T, a PA 11/BACT, a PA 5T/10T, a PA 11/6T/10T, a PA MXDT/10T, a PA MPMDT/10T, a PA BACT/10T, a PA BACT/6T, PA BACT/10T/6T, a PA 11/BACT/6T, a PA 11/MPMDT/6T, a PA 11/MPMDT/10T, a PA 11/BACT/10T, a PA 11/MXDT/10T, a PA 5T/10T.

Advantageously, in said multilayer structure, each sealing layer consists of a composition comprising the same type of polymer P1i, in particular a polyamide, and each reinforcing layer consists of a composition comprising the same type of polymer P2j, in particular a polyamide, provided that the polyamides P1i and P2j are different, that is to say that if the sealing layer(s) consist(s) of compositions comprising a long-chain aliphatic polyamide, then the sealing layer(s) consist(s) of compositions comprising a semi-aromatic polyamide.

Advantageously, said polymer P1i is a long-chain aliphatic polyamide, in particular PA1010, PA 1012, PA 1212, PA11, PA12, especially PA 11 or PA12, and said polymer P2j is a semi-aromatic polyamide, in particular chosen from among a PA MPMDT/6T, a PA PA11/10T, a PA 11/BACT, a PA 5T/10T, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/6T, PA 11/MPMDT/10T, PA 11/BACT/10T, a PA 11/MXDT/10T and a PA 5T/10T.

Advantageously, said multilayer structure consists of a single reinforcing layer and a single sealing layer in which said polymer P1i is a long-chain aliphatic polyamide, in particular PA1010, PA 1012, PA 1212, PA11, PA12, in particular PA 11 or PA12, and said polymer P2j is a semi-aromatic polyamide, in particular chosen from a PA MPMDT/6T, a PA PA11/10T, a PA 11/BACT, a PA 11/6T/10T a PA MXDT/10T, a PA MPMDT/10T, a PA BACT/10T, a PA BACT/6T, a PA BACT/10T/6T, a PA 11/BACT/6T, PA 11/MPMDT/6T, PA 11/MPMDT/10T, PA 11/BACT/10T, a PA 11/MXDT/10T.

According to one embodiment, said multilayer structure is a reservoir.

According to another embodiment, said multilayer structure is a flexible pipe.

The maximum temperature of use Tu of said multilayer structure is above 50° C., in particular above 100° C.

In one embodiment, said multilayer structure defined above has decompression resistance and drying ability.

Indeed, when storing or transporting hydrogen, the hydrogen can diffuse through the sealing layer(s) from the inside of the tube or reservoir to the interface between the last sealing layer and the first composite reinforcing layer, due to the permeability of the sealing layer(s) to the transported or stored hydrogen. The accumulation of hydrogen at this location can generate a pressure that will lead to the collapse of the sealing layer(s), when the internal pressure of the tube or reservoir is lower than the pressure at the interface with the composite reinforcement, which can occur in particular when the pumping or transport of hydrogen is stopped during a production stoppage that leads to a drop in pressure of several hundred bars to atmospheric pressure or when the storage reservoir is empty. The same applies to the internal water pressure tests of the reservoirs: this water is likely to migrate by permeation, at the interface between the composite reinforcement and the last layer of sealing and will subsequently be very difficult to remove, leading to long and costly drying cycles of said storage reservoirs, especially under vacuum.

In another embodiment, said multilayer structure defined above further comprises a metallic carcass located within the sealing layer.

This metallic carcass is not leakproof and is the innermost layer.

Advantageously, said multilayer structure further comprises at least one outer layer, in particular a metallic layer, said layer being the outermost layer of said multilayer structure.

Said outer layer is a second reinforcing layer but is metallic and not composite.

There may also be a polymeric protective layer (the outermost layer) on the structure, which has an anti-abrasion role or which allows an inscription to be placed on the structure.

Regarding the Fibrous Material

Regarding the fibers making up said fibrous material, they are in particular mineral, organic or plant fibers.

Advantageously, said fibrous material may be sized or unsized.

Said fibrous material can therefore comprise up to 0.1% by weight of an organic material (thermosetting or thermoplastic resin type) called sizing.

The mineral fibers include carbon fibers, glass fibers, basalt or basalt-based fibers, silica fibers, or silicon carbide fibers, for example. The organic fibers include thermoplastic or thermosetting polymer-based fibers, such as semi-aromatic polyamide fiber, aramid fibers or polyolefin fibers, for example. Preferably, they are amorphous thermoplastic polymer-based and have a glass transition temperature Tg higher than the Tg of the polymer or thermoplastic polymer mixture constituting the pre-impregnation matrix when the latter is amorphous, or higher than the Tm of the polymer or thermoplastic polymer matrix constituting the pre-impregnation matrix when the latter is semi-crystalline. Advantageously, they are semi-crystalline thermoplastic polymer-based and have a melting temperature Tm higher than the Tg of the polymer or thermoplastic polymer mixture constituting the pre-impregnation matrix when the latter is amorphous, or higher than the Tm of the polymer or thermoplastic polymer matrix mixture constituting the pre-impregnation matrix when the latter is semi-crystalline. Thus, there is no melting risk for the organic fibers constituting the fibrous material during the impregnation by the thermoplastic matrix of the final composite. The plant fibers include natural linen, hemp, lignin, bamboo, silk, in particular spider silk, sisal, and other cellulose fibers, in particular viscose. These plant fibers can be used pure, treated or coated with a coating layer, in order to facilitate the adherence and impregnation of the thermoplastic polymer matrix.

The fibrous material can also be a fabric, a braid or woven with fibers.

It can also correspond to fibers with support threads.

These component fibers may be used alone or in mixtures. Thus, organic fibers can be mixed with the mineral fibers to be pre-impregnated with thermoplastic polymer powder and to form the pre-impregnated fibrous material.

The organic fiber strands can have several grammages. They can further have several geometries. The component fibers of the fibrous material can further assume the form of a mixture of these reinforcing fibers with different geometries. The fibers are continuous fibers.

Preferably, the fibrous material consists of continuous carbon or glass fibers or or mixtures thereof, in particular carbon fibers. It is used in the form of a roving or several rovings.

According to another aspect, the present invention relates to a method of manufacturing a multilayer structure as defined above, characterized in that it comprises a step of welding the reinforcing layer as defined above to the sealing layer as defined above.

Advantageously, the welding step is carried out by a system selected from laser, infrared (IR) heating, LED heating, induction or microwave heating or high frequency (HF) heating.

Advantageously, said method comprises a step of extruding said sealing layer onto a metallic carcass and a step of welding the reinforcing layer onto the sealing layer.

According to another aspect, the present invention relates to the use of a multilayer structure selected from a reservoir or pipe or tube comprising, from the inside to the outside, at least one sealing layer as defined above and at least one composite reinforcing layer as defined above, said innermost composite reinforcing layer being welded to said outermost adjacent sealing layer, said sealing layers consisting of a composition predominantly comprising at least one semi-crystalline thermoplastic polymer P1i (i=1 to n, n being the number of sealing layers), the Tm of which, as measured according to ISO 11357-3: 2013, is less than 280° C., in particular less than 265° C., said at least one thermoplastic polymer of each sealing layer may be the same or different, and at least one of said composite reinforcing layers consisting of a fibrous material in the form of continuous fibers impregnated with a composition predominantly comprising at least one thermoplastic polymer P2j, (j=1 to m, m being the number of reinforcing layers), which is in particular semi-crystalline, said thermoplastic polymer P2j having a Tg, as measured according to ISO 11357-3: 2013, greater than the maximum temperature of use of said structure (Tu), where Tg≥Tu+20° C., in particular Tg≥Tu+30° C., Tu being greater than 50° C., in particular greater than 100° C., for the preparation of a reservoir or pipe or tube for transporting, distributing, or storing hydrogen.

EXAMPLES

In all examples, the reservoirs are obtained by rotational molding of the liner at a temperature adapted to the nature of the thermoplastic resin used, but in all cases below 280° C.

In the case of epoxy, a wet filament winding process is then used, which consists of winding fibers around the liner, which fibers are pre-impregnated in a liquid epoxy bath. The reservoir is then polymerized in an oven for 2 hours.

In all other cases, a fibrous material previously impregnated with the thermoplastic resin (tape) is used. This tape is deposited by filament winding using a robot with a 1500 W laser heater at a speed of 12 m/min and there is no polymerization step.

Example 1 (Counterexample)

Type IV hydrogen storage reservoir, composed of a T700SC31E (produced by Toray) carbon fiber epoxy composite reinforcement (Tg 80° C.) and a PA6 sealing layer.: no miscibility between the 2 resins (see table 1) which prevents any welding between the fibrous reinforcement and the sealing layer.

Example 2 (Counterexample)

Type IV hydrogen storage reservoir, composed of a T700SC31E (produced by Toray) carbon fiber epoxy composite reinforcement (Tg 80° C.) and an HDPE sealing layer.: no miscibility between the 2 resins (see table 1) which prevents any welding between the fibrous reinforcement and the sealing layer.

Example 3

Type IV or V hydrogen storage reservoir, composed of a T700SC31E (produced by Toray) BACT/10T carbon fiber composite reinforcement and a PA6 sealing layer: good partial miscibility between the 2 resins (see table I) which allows a good weld between the fibrous reinforcement and the sealing layer.

The selected BACT/10T composition has a melting temperature, Tm, of 283° C., a crystallization temperature, Tc, of 250° C. and a glass transition temperature of 164° C.

The Tg, Tc, and Tm are determined by differential scanning calorimetry (DSC) according to standards 11357-2:2013 and 11357-3:2013, respectively.

Example 4

Type IV or V hydrogen storage reservoir, composed of a T700SC31E (produced by Toray) BACT/10T carbon fiber composite reinforcement and a PA66 sealing layer: good partial miscibility between the 2 resins (see table I) which allows a good weld between the fibrous reinforcement and the sealing layer. The selected BACT/10T composition has a melting temperature, Tm, of 283° C., a crystallization temperature, Tc, of 250° C. and a glass transition temperature of 164° C. The Tg, Tc and Tm are determined by differential scanning calorimetry (DSC) according to 11357-2:2013 and 11357-3:2013 respectively.

The higher melting point of the PA66 liner (268.8° C.) compared to the PA6 liner (220° C.) in Example 3, facilitates the taping and fabrication of the reservoir.

Example 5

Type IV or V hydrogen storage reservoir, composed of a CT24-5.0/270-T140 (produced by SGL Carbon) 11/BACT/10T carbon fiber composite reinforcement and a PA11 sealing layer: good partial miscibility between the 2 resins (see table 1) which leads to a good weld between the fibrous reinforcement and the sealing layer. The selected 11/BACT/10T composition has a melting temperature, Tm, of 280° C., a crystallization temperature, Tc, of 220° C. and a glass transition temperature of 160° C. The Tg, Tc and Tm are determined by differential scanning calorimetry (DSC) according to 11357-2:2013 and 11357-3:2013 respectively.

Example 6

Type IV or V hydrogen storage reservoir, composed of a CT24-5.0/270-T140 (produced by SGL Carbon) 11/BACT/10T carbon fiber composite reinforcement and a PA11/10T sealing layer: good partial miscibility between the 2 resins (see table 1) which leads to a good weld between the fibrous reinforcement and the sealing layer.

The selected 11/BACT/10T composition has a melting temperature, Tm, of 280° C., a crystallization temperature, Tc, of 220° C. and a glass transition temperature of 160° C.

The Tg, Tc and Tm are determined by differential scanning calorimetry (DSC) according to 11357-2:2013 and 11357-3:2013 respectively.

The 11/10T composition used for the liner leads to a Tm of 255° C.

The use of an 11/10T liner with a melting point of 255° C., close to that of the 11/BACT/10T resin used as the matrix of the composite, facilitates the processing of the reservoir.

Example 7

Type IV or V hydrogen storage reservoir, composed of a CT24-5.0/270-T140 (produced by SGL Carbon) 11/BACT carbon fiber composite reinforcement and a PA11 sealing layer: good partial miscibility between the 2 resins (see table 1) which leads to a good weld between the fibrous reinforcement and the sealing layer. The selected 11/BACT composition has a melting temperature, Tm, of 278° C., a crystallization temperature, Tc, of 210° C. and a glass transition temperature of 157° C. The Tg, Tc and Tm are determined by differential scanning calorimetry (DSC) according to 11357-2:2013 and 11357-3:2013 respectively.

The use of a slow-crystallizing 11/BACT polymer allows lower taping temperatures than the 11/BACT/10T of the previous example and facilitates the use of a PA11 liner.

Example 8

Type IV or V hydrogen storage reservoir, composed of a CT24-5.0/270-T140 (produced by SGL Carbon) 11/BACT carbon fiber composite reinforcement and a PA11/10T sealing layer: good partial miscibility between the 2 resins (see table 1) which leads to a good weld between the fibrous reinforcement and the sealing layer.

The selected 11/BACT composition has a melting temperature, Tm, of 278° C., a crystallization temperature, Tc, of 210° C. and a glass transition temperature of 157° C. The Tg, Tc and Tm are determined by differential scanning calorimetry (DSC) according to standard 11357-2:2013 and 11357-3:2013 respectively.

The 11/10T composition used for the liner leads to a Tm of 255° C.

The use of an 11/10T liner with a melting point of 255° C., close to the 11/BACT which is the reinforcing resin of the composite, facilitates the implementation of the reservoir.

In all the examples in Table 1 below, to evaluate the miscibility of the resins, the mixtures were made from powders with a particle size of about 150 μm on micro-DSM with a recirculation time of 1 minute after melting. All mixtures were made at 300° C., except for the epoxy-polyethylene mixture which was made at 220° C.

At the end of the mixing process, the mixture is injected into a mold to make a test piece which will be characterized in DMA.

TABLE 1

| | Type of resin | Mixture (50/50 by weight) | Tg of each pure resin (Tg P1 and Tg P2) | Tg of each resin in the mixture (Tg P'1 and Tg P'2)*** | Ratio of the difference between the Tg of the resin in the mixture and the Tg of each pure resin (Tg P'2-Tg P'1)/ (Tg P'2-Tg P'1) (%) |
|---|---|---|---|---|---|
| Example 1 | Epoxy PA6 | Epoxy + PA6 | 80 50 | 80 50 | 100 |
| Example 2 | Epoxy HDPE | Epoxy + HDPE | 130 −100 | 130 −100 | 100 |
| Example 3 | BACT/10T PA6 | BACT/10T + PA6 | 178 50 | 109 94 | 12 |
| Example 4 | BACT/10T PA66 | BACT/10T + PA66 | 178 60 | 110 96 | 12 |
| Example 5 | 11/BACT/10T PA11 | 11/BACT/10T + PA11 | 168 50 | 115 90 | 21 |
| Example 6 | 11/BACT/10T 11/10T | 11/BACT/10T + 11/10T | 168 80 | 134 122 | 14 |
| Example 7 | 11/BACT PA11 | 11/BACT + PA11 | 168 50 | 120 85 | 30 |
| Example 8 | 11/BACT 11/10T | 11/BACT + 11/10T | 168 80 | 130 121 | 10 |

***Tg measurements are made by DMTA according to ISO 4664-1

Miscibility Test Results:
  column 4: glass transition temperature of each resin before mixing
  column 5: glass transition temperature of resins in the mixture
  column 6: ratio between the differences in glass transition temperature of the resins in the mixture and before mixing.
100% indicates non-miscibility of the resins,
<80% indicates low miscibility,
<30% indicates good but partial miscibility,
0 indicates full miscibility.

the invention claimed is:

1. A multilayer structure selected from a reservoir, pipe or tube, intended for transporting, distributing, or storing hydrogen, comprising, from the inside to the outside, at least one sealing layer and at least one composite reinforcing layer,
an innermost composite reinforcing layer being welded to an outermost adjacent sealing layer,
said at least one sealing layer consisting of a composition predominantly comprising at least one semi-crystalline thermoplastic polymer P1i (i=1 to n, n being the number of sealing layers), the Tm of which, as measured according to ISO 11357-3:2013, is less than 280° C., said at least one semi-crystalline thermoplastic polymer of each sealing layer may be the same, and
at least one of said at least one composite reinforcing layer consisting of a fibrous material in the form of continuous fibers impregnated with a composition comprising at least one thermoplastic polymer P2j, (j=1 to m, m being the number of reinforcing layers), said thermoplastic polymer P2j having a Tg, as measured according to ISO 11357-3:2013, greater than the maximum temperature of use of said structure (Tu), with Tg≥Tu+20° C., Tu being greater than 50° C.

2. The multilayer structure according to claim 1, wherein each polymer P1i of each reinforcing layer is partially or fully miscible with each polymer P1j of the adjacent layer(s), each polymer P2j of each reinforcing layer is partially or fully miscible with each polymer P2j of the adjacent layer(s), and the polymer P21 is partially or fully miscible with polymer P11 adjacent thereto,
the total or partial miscibility of said polymers being defined by the difference in glass transition temperature of the two resins, in the mixture, relative to the difference in glass transition temperature of the two resins, before the mixture, and the miscibility being total when said difference is equal to 0, and the miscibility being partial when said difference is different from 0.

3. The multilayer structure according to claim 1, wherein each sealing layer comprises the same type of polymer.

4. The multilayer structure according to claim 1, wherein each reinforcing layer comprises the same type of polymer.

5. The multilayer structure according to claim 3, wherein each sealing layer comprises the same type of polymer, and each reinforcing layer comprises the same type of polymer.

6. The multilayer structure according to claim 1, wherein the multilayer structure has a single sealing layer and a single reinforcing layer.

7. The multilayer structure according to claim 1, wherein said multilayer structure is a reservoir or a flexible pipe.

8. The multilayer structure according to claim 1, wherein said composition comprising said polymers P1 and P2 also comprises additives, enabling them to absorb radiation suitable for welding.

9. The multilayer structure according to claim 1, wherein said composition comprising said polymer P2j is transparent to radiation suitable for welding.

10. The multilayer structure according to claim 8, wherein the welding is carried out by a system selected from laser, infrared (IR) heating, LED heating, induction or microwave heating or high frequency (HF) heating.

11. The multilayer structure according to claim 1, wherein said polymer P1i is a polyamide.

12. The multilayer structure according to claim 1, wherein said polymer P2j is a polyamide.

13. The multilayer structure according to claim 11, wherein said polymer P1i and said polymer P2j are polyamides.

14. The multilayer structure according to claim 11, wherein said polymer P1i is a long-chain aliphatic polyamide, or semi-aromatic.

15. The multilayer structure according to claim 12, wherein said polymer P2j is a semi-aromatic polyamide chosen from a PA MPMDT/6T, a PA 11/10T, a PA 11/BACT, a PA 5T/10T a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/6T, PA 11/MPMDT/10T, PA 11/BACT/10T, a PA 11/MXDT/10T, a PA11/5T/10T.

16. The multilayer structure according to claim 13, wherein said polymer Pli is a long-chain aliphatic polyamide, or semi-aromatic, and said polymer P2j is a semi-aromatic polyamide, chosen from a PA MPMDT/6T, a PA PA11/10T, a PA 11/BACT, a PA 5T/10T, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/6T, PA 11/MPMDT/10T, PA 11/BACT/10T, a PA 11/MXDT/10T, a PA11/5T/10T.

17. The multilayer structure according to claim 1, wherein it has decompression resistance and drying ability.

18. The multi-layer structure according to claim 1, wherein said structure further comprises a metalliclic carcass located within the sealing layer.

19. The multilayer structure according to claim 1, wherein said structure further comprises at least one outer layer, said outer layer being the outermost layer of said multilayer structure.

20. The multilayer structure according to claim 1, wherein the fibrous material is selected from glass fibers and carbon or basalt or basalt-based fibers.

21. The method for manufacturing a multilayer structure as defined in claim 1, wherein the method comprises a step of welding the reinforcing layer to the sealing layer.

22. The method according to claim 21, wherein the welding step is carried out by a system selected from laser, infrared (IR) heating, LED heating, induction or microwave heating or high frequency (HF) heating.

23. The method according to claim 21, wherein the method comprises a step of extruding said sealing layer onto a metalliclic carcass and a step of welding the reinforcing layer onto the sealing layer.

* * * * *